(12) United States Patent
Kuo

(10) Patent No.: US 9,376,153 B1
(45) Date of Patent: Jun. 28, 2016

(54) CONTROL DEVICE OF THE HEIGHT ADJUSTMENT FOR A BICYCLE SEAT POST

(71) Applicant: Taiwan Hodaka Industrial Co., Ltd., Taipei (TW)

(72) Inventor: Frank Kuo, Taipei (TW)

(73) Assignee: Taiwan Hodaka Industrial Co., Ltd., Taipei (TW)

(*) Notice: Subject to any disclaimer, the term of this patent is extended or adjusted under 35 U.S.C. 154(b) by 0 days.

(21) Appl. No.: 14/604,798

(22) Filed: Jan. 26, 2015

(51) Int. Cl.
*F16C 1/12* (2006.01)
*B62J 1/06* (2006.01)
*B62J 1/08* (2006.01)

(52) U.S. Cl.
CPC .............. *B62J 1/06* (2013.01); *B62J 2001/085* (2013.01)

(58) Field of Classification Search
CPC .......... B62J 2001/085; B62J 1/06; B62J 1/08; B62J 1/02; B62K 19/36; Y10T 74/2042; F16C 1/12
See application file for complete search history.

(56) References Cited

U.S. PATENT DOCUMENTS

| 6,220,582 | B1* | 4/2001 | Wandschneider | B62J 1/06 267/64.12 |
| 2014/0305253 | A1* | 10/2014 | Tseng | B62J 1/06 74/502.2 |
| 2015/0191208 | A1* | 7/2015 | Hsu | B62J 1/06 403/322.3 |
| 2015/0225030 | A1* | 8/2015 | Shirai | B62K 19/36 403/27 |

FOREIGN PATENT DOCUMENTS

TW M481860 U 7/2014
TW EP 2886428 A1 * 6/2015 ................. B62J 1/06

* cited by examiner

*Primary Examiner* — Adam D Rogers
(74) *Attorney, Agent, or Firm* — Alan D. Kamrath; Kamrath IP Lawfirm, P.A.

(57) ABSTRACT

A control device of the height adjustment for a bicycle seat post is a pull-down control device secured to the bottom end of the lower outer tube of the seat post. A linkage mechanism is managed by a controlling wire driving the main pin of the oil hydraulic mechanism to axially move upwards to adjust the height of the seat post. Besides, the control device includes the linkage mechanism instead of an oil hydraulic mechanism, so it requires less elements and avoids oil leaking as well as working hours consumed occurring in the prior art control mechanism of the height adjustment for a bicycle seat post. Consequently the control device increases the stability in operation and the speed in assembling.

4 Claims, 5 Drawing Sheets

CONTROL DEVICE OF THE HEIGHT ADJUSTMENT FOR A BICYCLE SEAT POST

BACKGROUND OF THE INVENTION

1. Field of the Invention

The present invention relates to a control device of the height adjustment for a bicycle seat post and, more particularly, to a control device, which is a pull-down control device of the height adjustment for a bicycle seat post, comprised of a linkage mechanism, increasing the stability in operation and the speed in assembling.

2. Description of the Prior Art

The bicycle seat post is inserted into the seat tube of the bicycle, and the top end of the seat post is disposed with a seat whose height is allowed to be adjusted by adjusting the height of the seat post. A prior art control mechanism of the height adjustment for a bicycle seat post is managed by a controlling wire. According to the position of the controlling wire, the control mechanisms may be classified into two modes described as follows:

1. A pull-up control mechanism of the height adjustment for a bicycle seat post:

One end of the controlling wire arranged to the pull-up control mechanism of the height adjustment for the bicycle seat post is connected to the top end of the inner tube arranged to the seat post to be able to control a cam to move eccentrically to drive a pin of an oil hydraulic mechanism within the inner tube to move axially. Thus, the seat is unlocked to adjust the seat height. Furthermore, the seat height may alter with axially moving of the inner tube. When the inner tube moves up or down, the controlling wire will generate a residual wire caused by the gap of the relative displacement resulting from the axially moving of the inner tube, and the residual wire extends to the outside of the seat post. Therefore the residual wire causes inconvenience in use.

2. A pull-down control device of the height adjustment for a bicycle seat post:

The pull-down control device of the height adjustment for a bicycle seat post, as disclosed in Taiwan Patent M481860, is secured to the bottom end of the lower outer tube of the seat post. The bottom end of the lower outer tube is inserted into the seat tube of the bicycle frame so as to be fixed to each other. The pull-down control device of the height adjustment for a bicycle seat post will not move/displace with the seat height adjustments, so that it will not generate the residual wire occurring in the pull-up control mechanism of the height adjustment for a bicycle seat post after the seat height is adjusted. However, the pull-down control device of the height adjustment for a bicycle seat post disclosed in Taiwan Patent M481860 is an oil hydraulic unit which is managed by a controlling wire to drive a lower pin of the oil hydraulic unit to counterclockwise axially move upwards to push a main pin of the oil hydraulic unit within the inner tube to move axially to unlock the seat post for the seat height adjustments. Because the pull-down control device of the height adjustment for a bicycle seat post is an oil hydraulic unit, oil leakage occurs easily if the oil sealing assembly does not process well or the sealing pieces fail in tightness. Besides, more elements may cause more working hours in assembling and higher malfunction, so that it needs to be ameliorated.

SUMMARY OF THE INVENTION

It is against the background and the drawbacks associated therewith that the present invention has been developed.

The objective of the present invention is to provide a control device of the height adjustment for a bicycle seat post which allows not only to comprise less elements but also to avoid oil leaking and to increase the stability in operation and the speed in assembling.

The control device of the height adjustment for a bicycle seat post disclosed in the present invention is secured to the bottom end of the lower outer tube of the seat post for managing a main pin inside the seat post to axially move upwards to unlock the seat post to adjust the height of the seat post. The control device of the height adjustment for a bicycle seat post is a pull-down control device including a body and a linkage unit. The body is secured to the lower outer tube of the seat post. Moreover, the linkage unit is comprised of at least one pull-down member at the lower portion and at least one push-up member at the upper portion. The middle section of the pull-down member and the middle section of the push-up member are eccentrically pivoted with the body respectively. One of the push-up member and the pull-down member provides a connecting pin which is arranged to the end where the push-up member and the pull-down member are near each other, and the other member provides a sliding slot arranged at the end where the push-up member and the pull-down member are near each other. Moreover, the opening of the sliding slot is larger than the external diameter of the connecting pin to allow the connecting pin to slide within the sliding slot for combination. The push-up member is arranged with a push-up end relative to a main pin on top of the push-up member, and the pull-down member is provided with a control end for connecting a controlling wire. When a user pulls the controlling wire arranged to the bicycle handlebar, the controlling wire drives the push-up member and the pull-down member to take the pivot pin as the pivot point to turn eccentrically, and the pull-down member turns in the opposite direction to the push-up member. Further, the push-up end of the push-up member is driven to move up to push the main pin to axially move upwards to unlock the oil hydraulic mechanism within the seat post to allow the seat height to be adjusted. When the controlling wire is released, the height of the seat is allowed to be secured. The control device of the height adjustment for a bicycle seat post disclosed in the present invention is a pull-down control device comprised of a linkage mechanism, so the control device requires less elements, and thus it increases the operation stability and the assembling speed. Moreover, it may avoid oil leaking, because it is not an oil hydraulic type.

BRIEF DESCRIPTION OF THE DRAWINGS

In order that the present invention may be more fully understood, a preferred embodiment thereof will now be described with reference to the accompanying drawings, in which.

DESCRIPTION OF THE PREFERRED EMBODIMENTS

The means for achieving the aforesaid objective and the functions of the present invention will become apparent from the following description, taken in connection with the accompanying drawings, with a preferred embodiment of the present invention being disclosed.

Figure 1:
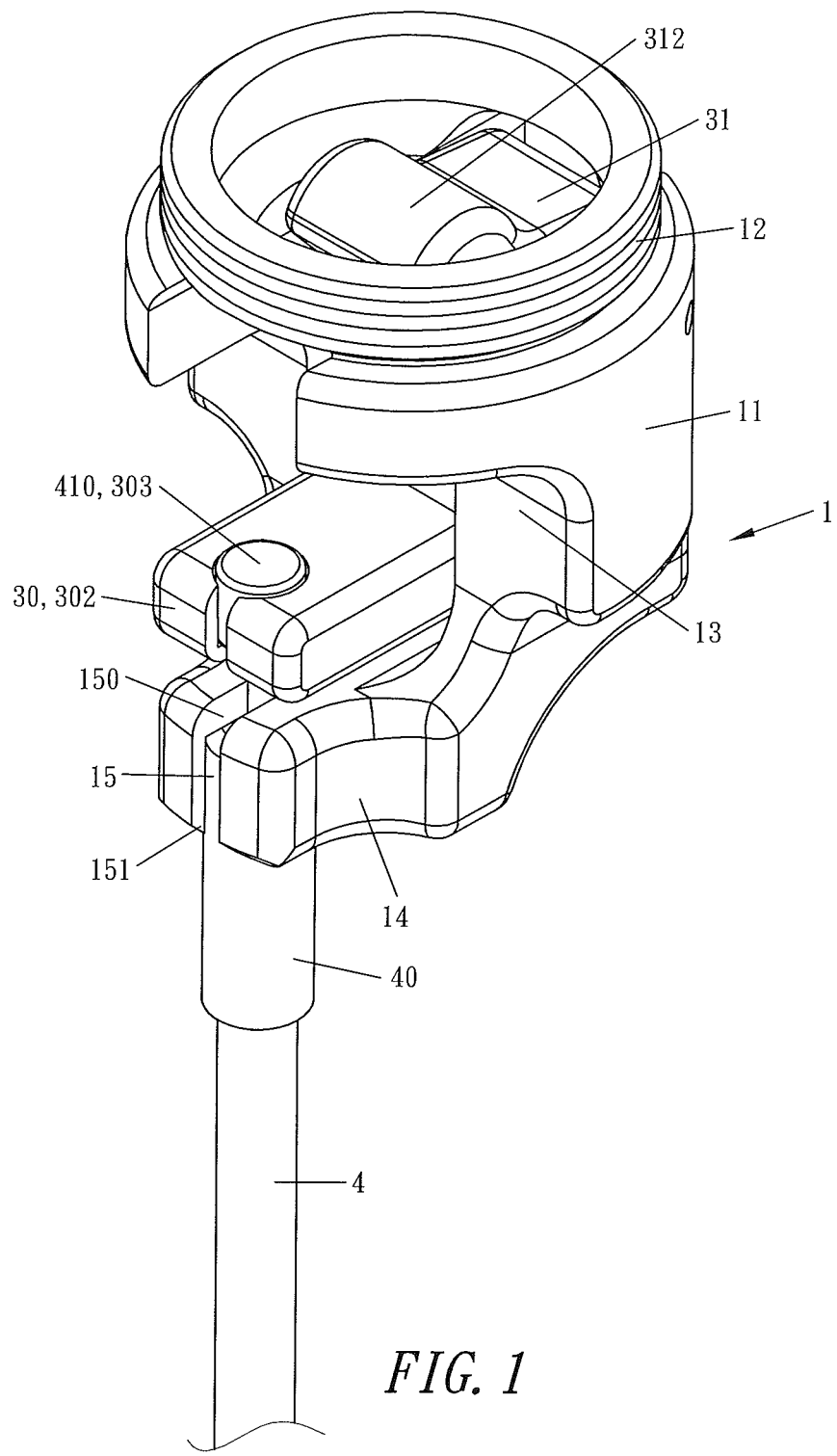
FIG. 1 is a stereogram showing the combination of the preferred embodiment of the present invention.
Figure 2:
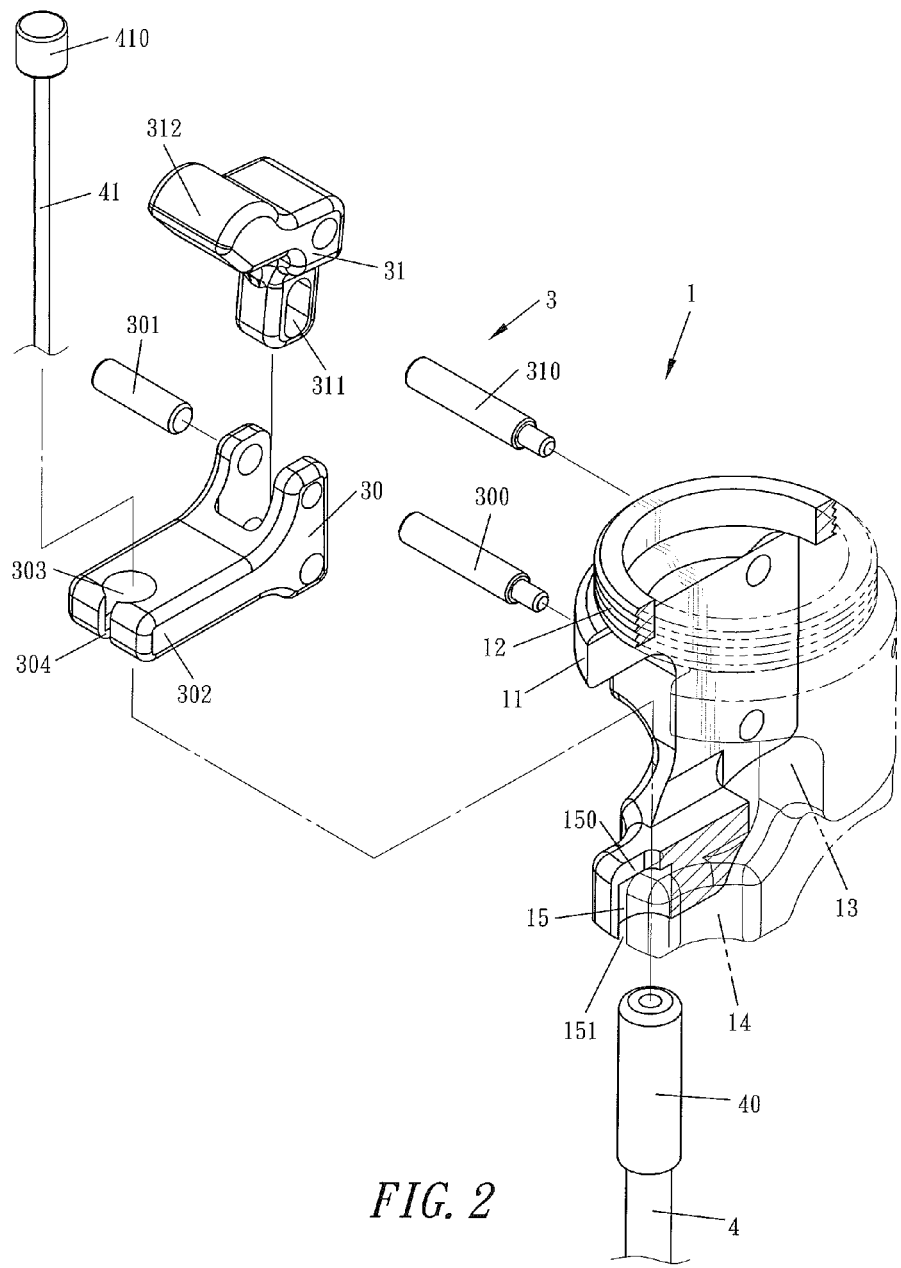
FIG. 2 is a breakdown stereogram of the preferred embodiment of the present invention.
Figure 3:
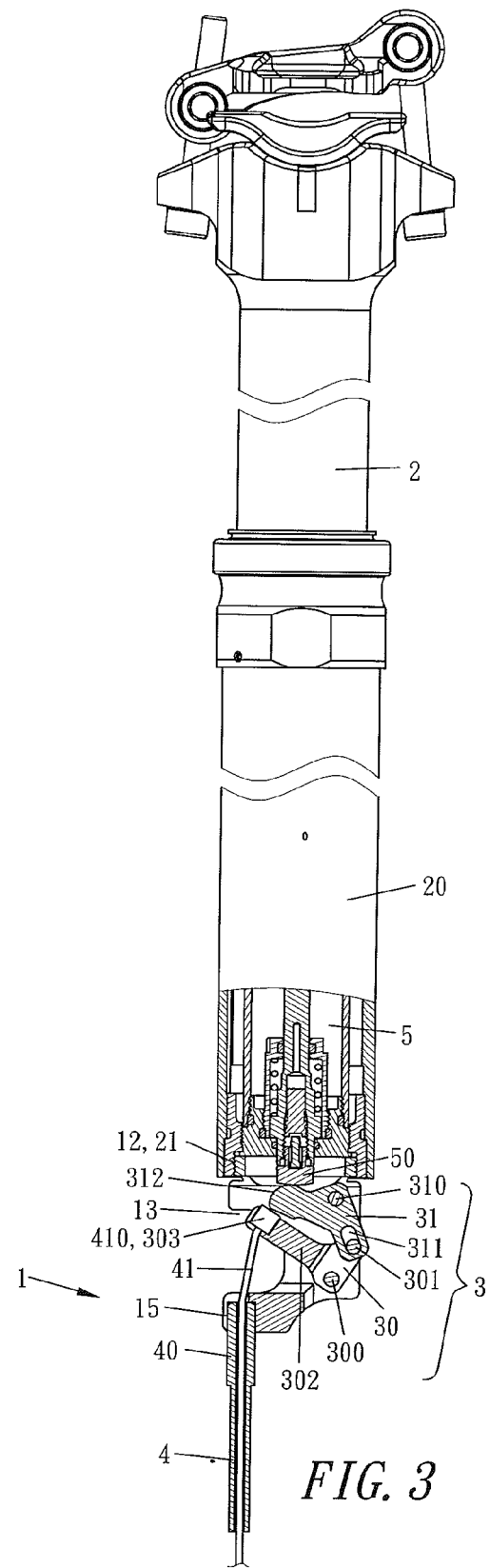
FIG. 3 is a sectional view showing the preferred embodiment of the present invention combined with the seat post.

Referring to FIG. 1 to FIG. 3, the control device for managing the adjustment of a bicycle seat height disclosed in the present invention is a control device 1, which is fixed to the bottom end of the lower outer tube 20 of the seat post 2 arranged to the bicycle frame. The lower outer tube 20 is secured to the seat tube of the bicycle frame.

A body 11, which is hollow and whose top outer side provides an outer thread section 12 screwed with an inner thread section 21, is arranged on the inner surface of the bottom end of the lower outer tube 20 to allow the body 11 to be fixed without moving. Moreover, one side of the body 11 is provided with an opening 13, and the bottom end of the body 11 under the opening 13 is arranged with a supporting arm 14 whose outer side provides a limiting slot 15. The limiting slot 15 has the upper opening 150 smaller than the lower opening 151 thereof.

A linkage unit 3 is arranged inside the body 11 and includes at least one pull-down member 30 at the lower portion and at least one push-up member 31 at the upper portion. The middle section of the pull-down member 30 and the middle section of the push-up member 31 are eccentrically pivoted with the body 11 by a pivot pin 300 and 310 respectively. The pull-down member 30 has one end arranged with a connecting pin 301 positioned near the push-up member 31 and the other end provided with a control end 302 extending along the top of the supporting arm 14. Moreover, the top surface of the control end 302 provides a concave holding slot 303 whose inner bottom side is arranged with a wire hole 304 allowing a bare wire 41 of a controlling wire 4 to pass through. Furthermore, the push-up member 31, at the side near the pull-down member 30, is provided with an elongated sliding slot 311 larger than the external diameter of the connecting pin 301, and the elongated sliding slot 311 provides the length allowing the connecting pin 301 to slide therein. Besides, the top side of the push-up member 31 is arranged with a push-up end 312 relative to and touching a main pin 50 of an oil hydraulic mechanism 5 within the seat post 2 on top of the push-up member 31. Moreover, the main pin 50 is allowed to be pushed up by the push-up end 312 to axially move upwards to unlock the seat post 2 to adjust the height of the seat post 2.

When the control device is assembled, one end of the controlling wire 4 is fixed to the bicycle handlebar and managed by a lever. Moreover, the end portion of the outer protective sleeve 40 of the controlling wire 4 at the other end of the controlling wire 4 is inserted into the limiting slot 15 from the lower opening 151 to allow the end portion of the outer protective sleeve 40 of the controlling wire 4 to be limited within the limiting slot 15. Next, the bare wire 41 of the controlling wire 4 passes through the upper opening 150 of the limiting slot 15. Then, an enlarged head-end 410 of the bare wire 41 of the controlling wire 4 is inserted into the holding slot 303 of the control end 302 arranged on the pull-down member 30 to allow the control end 302 of the pull-down member 30 to be pulled down by the controlling wire 4 to cause the control end 302 to make pivot movements via the pivot pin 300 which is regarded as the pivot point of the pivot movements.

Figure 4:
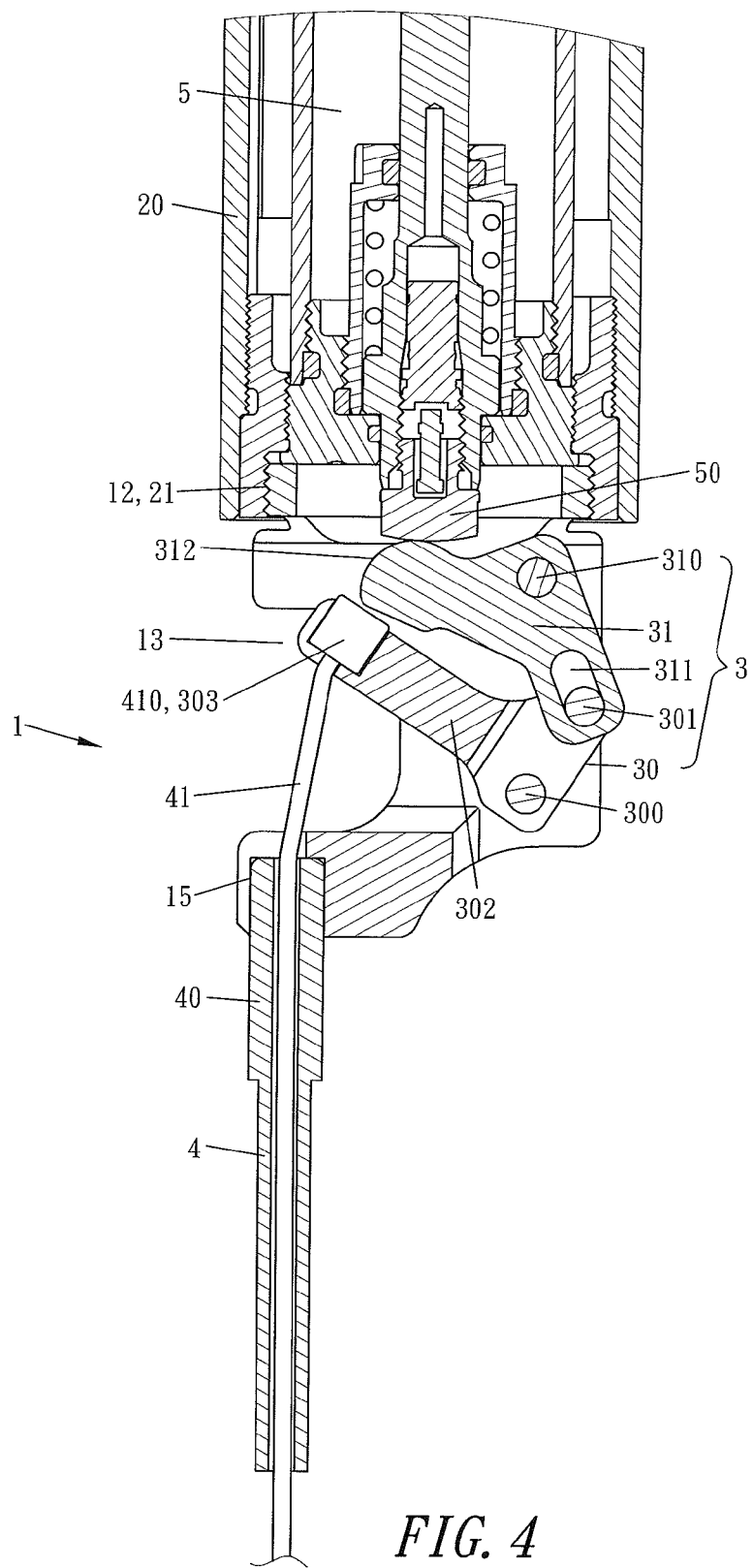
FIG. 4 is an enlarged view of FIG. 3.
Figure 5:
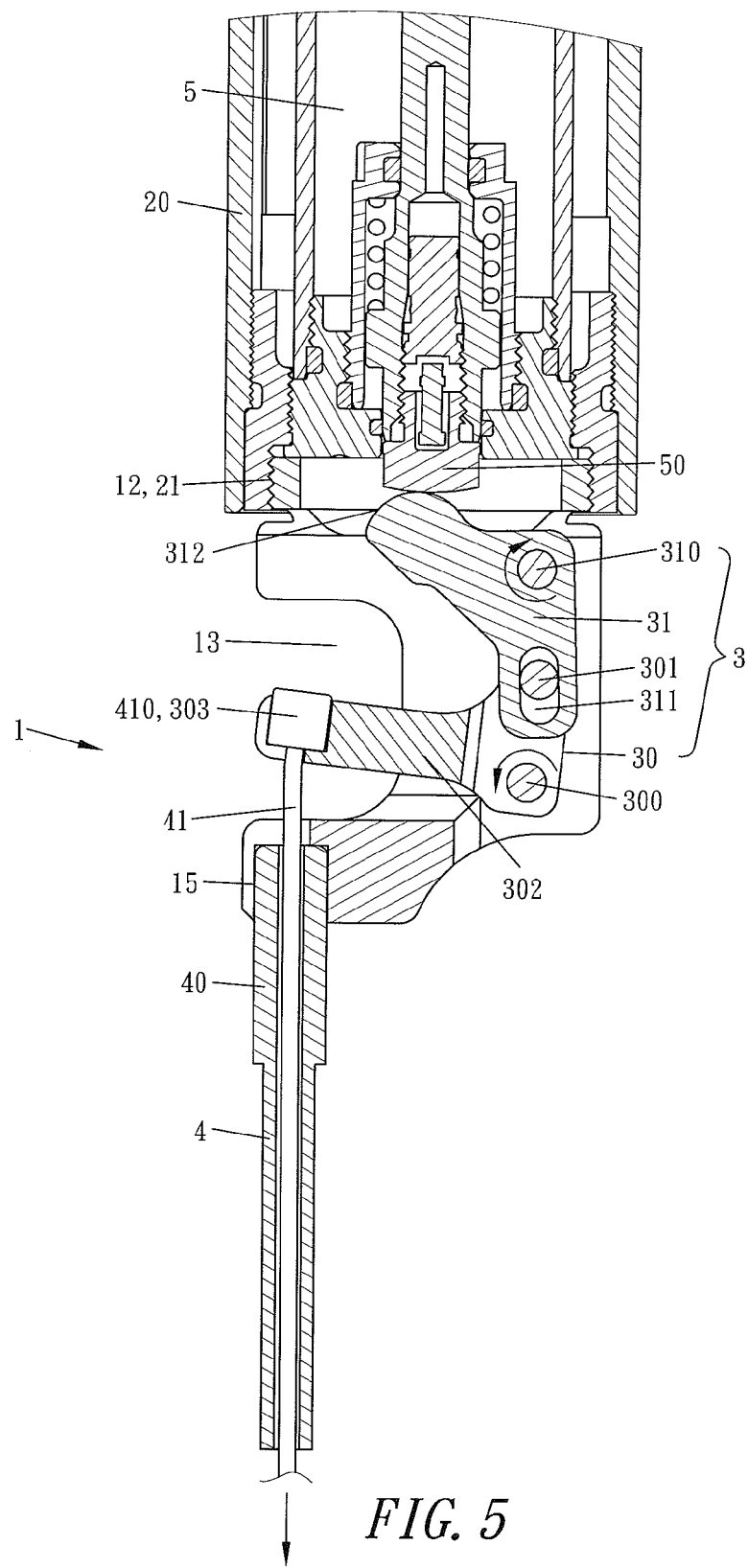
FIG. 5 is a diagram showing the structure of the preferred embodiment of the present invention when the controlling wire is in a state of being pulled down.

Referring to FIG. 4 and FIG. 5, when a user clasps the lever of the controlling wire 4 arranged to the bicycle handlebar, the control end 302 of the pull-down member 30 is driven to move down. The pull-down member 30 takes the pivot pin 300 as the pivot point to drive the control end 302 and the connecting pin 301 to simultaneously turn counterclockwise (side-look direction, as shown in FIG. 5) to allow the connecting pin 301 to lead the push-up member 31 to turn clockwise (that is, the pull-down member 30 turns in the opposite direction to the push-up member 31). The push-up member 31 takes the pivot pin 310 as the pivot point to drive the push-up end 312 to move up to push the main pin 50 of the oil hydraulic mechanism 5 up to direct the oil hydraulic mechanism to release pressure to unlock the seat post 2, so that the seat height is allowed to be adjusted, as shown in FIG. 5. After being adjusted, the seat height needs to be secured. When the lever of the controlling wire 4 is released, the main pin 50 returns to its home position without being pushed up, as shown in FIG. 4, and the oil hydraulic mechanism 5 simultaneously returns to the locking state. Thus, the height of the seat post 2 is secured.

The connecting pin 301 is allowed to combine with the sliding slot 311 without restriction. That is, the connecting pin 301 may be arranged on the push-up member 31, and the sliding slot 311 may be disposed on the pull-down member 30.

The control device of the height adjustment for a bicycle seat post disclosed in the present invention is comprised of a linkage mechanism so that the control device 1 requires less elements. Therefore, it increases the stability in operation and the speed in assembling. Moreover, it avoids oil leaking, because it is not an oil hydraulic type.

It will be appreciated by those skilled in the art that variations and modifications to the invention described herein will be apparent without departing from the spirit and scope thereof. The variations and modifications as would be apparent to persons skilled in the art are deemed to fall within the broad scope and ambit of the invention as herein set forth.

What is claimed is:

1. A control device for a bicycle seat post is secured to a bottom end of a lower outer tube of the bicycle seat post for managing a main pin within the bicycle seat post to axially move upwards to adjust the height of the bicycle seat post; with the control device comprising:

a body secured to the lower outer tube of the seat post; and a linkage unit including a pull-down member at a lower portion and a push-up member at an upper portion; wherein a middle section of the pull-down member and a middle section of the push-up member are pivoted with the body by a pivot pin respectively; wherein one of the push-up member and the pull-down member provides a connecting pin which is arranged at a first end where the push-up member and the pull-down member engage each other, wherein the other one of the push-up member and the pull-down member provides a sliding slot arranged at the first end where the push-up member and the pull-down member engage each other; wherein the sliding slot is larger than an external diameter of the connecting pin and the connecting pin is inside the sliding slot; wherein a second end of the pull-down member is provided with a control end connecting with a controlling wire, wherein a second end of the push-up member is arranged with a push-up end positioned under the main pin; and wherein the second end of the push-up member pushes the main pin to move up when the controlling wire is pulled down.

2. The control device for a bicycle seat post as claimed in claim 1, wherein the body is hollow and has a top outer side provided with an outer thread section screwed with an inner thread section arranged on an inner surface of the bottom end of the lower outer tube; wherein one side of the body is provided with an opening, wherein a bottom end of the body under the opening is arranged with a supporting arm whose outer side provides a limiting slot; wherein the limiting slot has an upper opening smaller than a lower opening; wherein an end portion of an outer protective sleeve at an outer side of the controlling wire is inserted into the limiting slot from the lower opening of the limiting slot to allow the end portion of the outer protective sleeve of the controlling wire to be within the limiting slot, and wherein a bare wire of the controlling wire passes through the upper opening of the limiting slot to be pulled out.

3. The control device for a bicycle seat post as claimed in claim 2, wherein a top surface of a control end of the pull-down member provides a concave holding slot whose inner bottom side is arranged with a wire hole allowing the bare wire of the controlling wire to pass through, and wherein an enlarged head-end of the bare wire of the controlling wire is fixed in the concave holding slot.

4. The control device for a bicycle seat post as claimed in claim 3, wherein the connecting pin is arranged to the pull-down member, and wherein the sliding slot is arranged to the push-up member.

* * * * *